(12) United States Patent
Neal et al.

(10) Patent No.: US 6,766,467 B1
(45) Date of Patent: Jul. 20, 2004

(54) METHOD AND APPARATUS FOR PAUSING A SEND QUEUE WITHOUT CAUSING SYMPATHY ERRORS

(75) Inventors: Danny Marvin Neal, Round Rock, TX (US); Gregory Michael Nordstrom, Pine Island, MN (US); Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 09/692,340

(22) Filed: Oct. 19, 2000

(51) Int. Cl.⁷ .............................................. G06F 11/00
(52) U.S. Cl. ......................................................... 714/5
(58) Field of Search ............................. 714/4, 5, 8, 42, 714/43, 44; 710/59

(56) References Cited

U.S. PATENT DOCUMENTS

| | | | | |
|---|---|---|---|---|
| 4,975,829 A | * | 12/1990 | Clarey et al. | ................. 703/24 |
| 6,529,286 B1 | * | 3/2003 | King | ......................... 358/1.14 |
| 2002/0133620 A1 | * | 9/2002 | Krause | ....................... 709/238 |

* cited by examiner

*Primary Examiner*—Scott Baderman
(74) *Attorney, Agent, or Firm*—Duke W. Yee; Mark E. McBurney; Stephen J. Walder, Jr.

(57) ABSTRACT

A method and apparatus for pausing a send queue while preventing sympathy error from propagating through a SAN fabric system is provided. The method and apparatus place a send work queue in an error state, i.e. pauses the send work queue, when a reliable data error occurs in the send work queue but does not place any other work queues in an error state. In this way, the send queue experiencing the error is not able to send any further messages until error recovery is performed. However, other work queues continue to be able to send and/or receive messages. Once error recovery is performed, the send work queue that was placed in the error state is returned to a working state and is able to continue to send messages. In addition, the send queue that was in the error state will send the messages that it attempted to send at the time of the error. The messages sent will continue from a last known point at which the send work queue was operating properly. Other features and advantages of the present invention will be described in, or will become apparent to those of ordinary skill in the art in view of, the following description of the preferred embodiments.

28 Claims, 5 Drawing Sheets

| 750<br>REQUEST PACKET ERROR TYPE | 710<br>REQUESTER QUEUE PAIR || 720<br>RESPONDER QUEUE PAIR ||
|---|---|---|---|---|
| | EFFECT ON LOCAL QP STATE || EFFECT ON REMOTE QP STATE ||
| | SEND QUEUE ERROR STATE<br>730 | RECEIVE QUEUE ERROR STATE<br>731 | SEND QUEUE ERROR STATE<br>740 | RECEIVE QUEUE ERROR STATE<br>741 |
| NO ERROR | NONE | NONE | NONE | NONE |
| SEND QUEUE ERROR TYPE | ERROR STATE | NONE | NONE | NONE |

| REQUEST PACKET ERROR TYPE | REQUESTER QUEUE PAIR | | RESPONDER QUEUE PAIR | |
|---|---|---|---|---|
| | EFFECT ON LOCAL QP STATE | | EFFECT ON REMOTE QP STATE | |
| | SEND QUEUE ERROR STATE 730 | RECEIVE QUEUE ERROR STATE 731 | SEND QUEUE ERROR STATE 740 | RECEIVE QUEUE ERROR STATE 741 |
| NO ERROR | NONE | NONE | NONE | NONE |
| SEND QUEUE ERROR TYPE | ERROR STATE | NONE | NONE | NONE |

METHOD AND APPARATUS FOR PAUSING A SEND QUEUE WITHOUT CAUSING SYMPATHY ERRORS

CROSS REFERENCES TO RELATED APPLICATIONS

The present invention is related to applications entitled A System Area Network of End-to-End Context via Reliable Datagram Domains, U.S. patent application Ser. No. 09/692,354; Method and Apparatus to Perform Fabric Management U.S. patent application Ser. No. 09/692,334; End Node Partitioning using LMC for a System Area Network, U.S. patent application Ser. No. 09/692,351; Method and Apparatus for Dynamic Retention of System Area Network Management Information in Non-Volatile Store, U.S. patent application Ser. No. 09/692,365; Method and Apparatus for Retaining Network Security Settings Across Power Cycles, U.S. patent application Ser. No. 09/692,337; Method and Apparatus for Reporting Unauthorized Attempts to Access Nodes in a Network Computing System, U.S. patent application Ser. No. 09/692,348; Method and Apparatus for Reliably Choosing a Master Network Manager During Initialization of a Network Computing System, U.S. patent application Ser. No. 09/692,346; Method and Apparatus for Ensuring Scalable Mastership During Initialization of a System Area Network, U.S. patent application Ser. No. 09/692,341; and Method and Apparatus for Using a Service ID for the Equivalent of Port ID in a Network Computing System, U.S. patent application Ser. No. 09/692,352, all of which are filed even date hereof, assigned to the same assignee, and incorporated herein by reference.

BACKGROUND OF THE INVENTION

1. Technical Field

The present invention relates generally to an improved data processing system, and in particular to a method and apparatus for pausing a send queue in a data processing system without causing sympathy errors.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes of reassembling inbound messages and placing them in the memory space designated by the destination's consumer.

Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

In a SAN fabric such as that described above, when a work request is sent from a send work queue of a first consumer to a receive work queue of a second consumer, error conditions may occur. When a reliable datagram error condition occurs, both the send work queue and receive work queue of the first consumer is placed in an error state and an indication of an error having occurred is sent to the receive work queue of the second consumer. In response to receiving the error indication from the first consumer, the receive queue of the second consumer is also placed in an error state.

The error-state prevents other consumers from sending messages to receive work queues placed in the error state and prevents the send work queues placed in the error state from sending messages. Thus, it can be seen that an error occurring in one consumer may be propagated to a number of other consumers, and so on. This is known as sympathy error.

This cascading effect may become severe enough to affect all work queues in the SAN fabric. Thus, it would be beneficial to have an apparatus and method for preventing sympathy error in a SAN fabric system.

SUMMARY OF THE INVENTION

The present invention provides an apparatus and method for pausing a send queue while preventing sympathy error from propagating through a SAN fabric system. The apparatus and method of the present invention place a send work queue in an error state, i.e. pauses the send work queue, when an error occurs in the send work queue but does not place any other work queues in an error state. In this way, the send queue experiencing the error is not able to send any further messages until error recovery is performed. However, other work queues continue to be able to send and/or receive messages. Once error recovery is performed, the send work queue that was placed in the error state is returned to a working state and is able to continue to send messages. In addition, the send queue that was in the error state will send the messages that it attempted to send at the time of the error. The messages sent will continue from a last known point at which the send work queue was operating properly. Other features and advantages of the present invention will be described in, or will become apparent to those of ordinary skill in the art in view of, the following description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
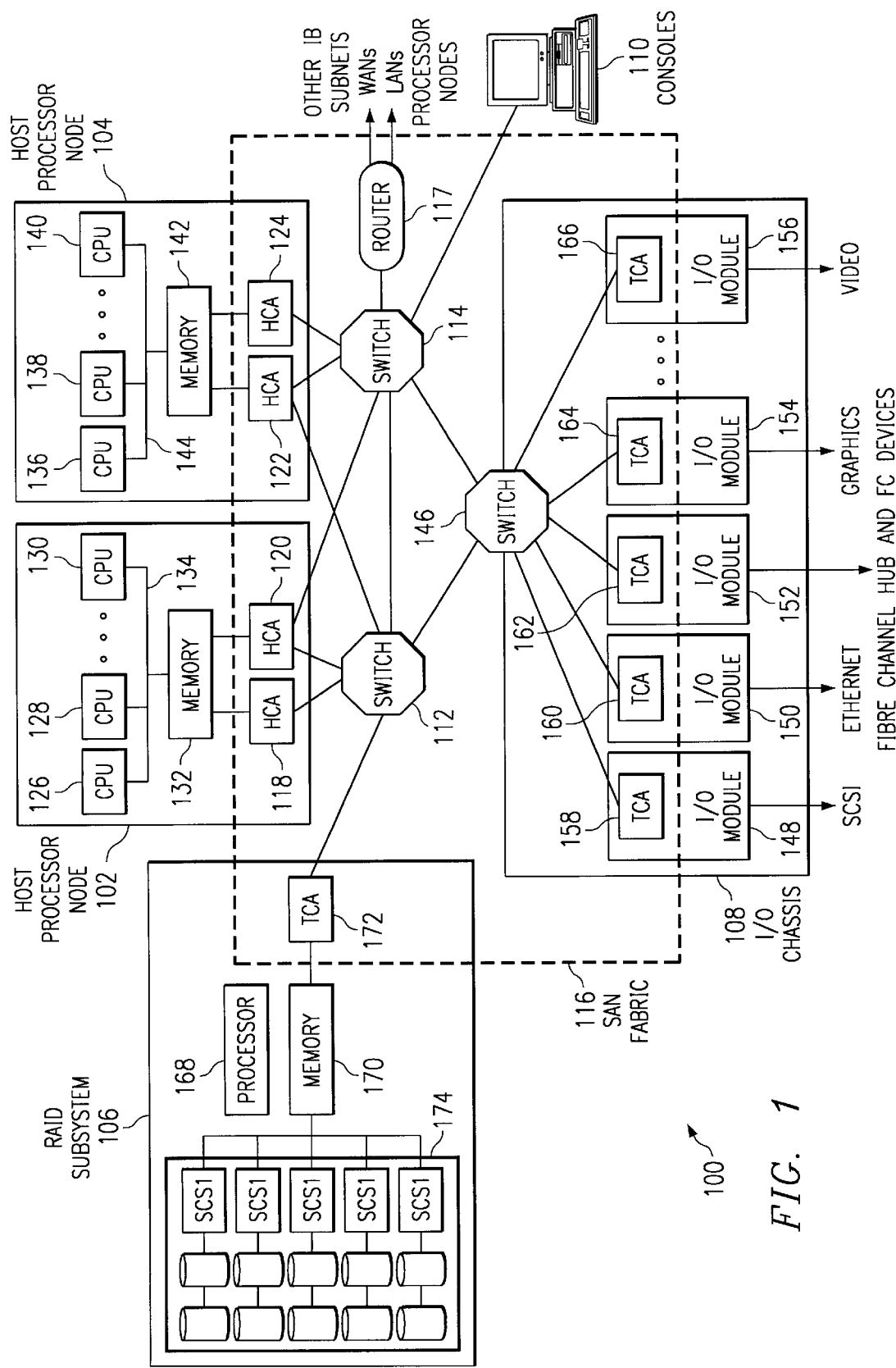
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 may take the form of a system area network (SAN) 100 and is provided merely for illustrative purposes. Embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

In this example, SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array of independent disk (RAID) subsystem node 106, and I/O adapter node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, and router 116. A switch is a device that connects multiple links together and allows routing of packets from one link to another link within a subnet using a small header Destination Local Identifier (DLID) field. A router is a device that connects multiple links together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed. Endnodes, switches, and routers are collectively referred to as end stations.

In SAN 100 as illustrated in FIG. 1, host processor node 102, host processor node 104, and I/O node 108 include at least one channel adapter (CA) to interface to SAN 100. In one embodiment, each channel adapter is an end point that implements the channel adapter interface in sufficient detail to source or sink packets transmitted on SAN fabric 110. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware off loads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O consumers and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O adapter node 108 in FIG. 1 includes an I/O adapter backplane 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in the distributed computer system. With an I/O adapter attached to the SAN 100, the resulting I/O adapter node has substantially the same communication capability as any host processor node in SAN 100.

Figure 2:
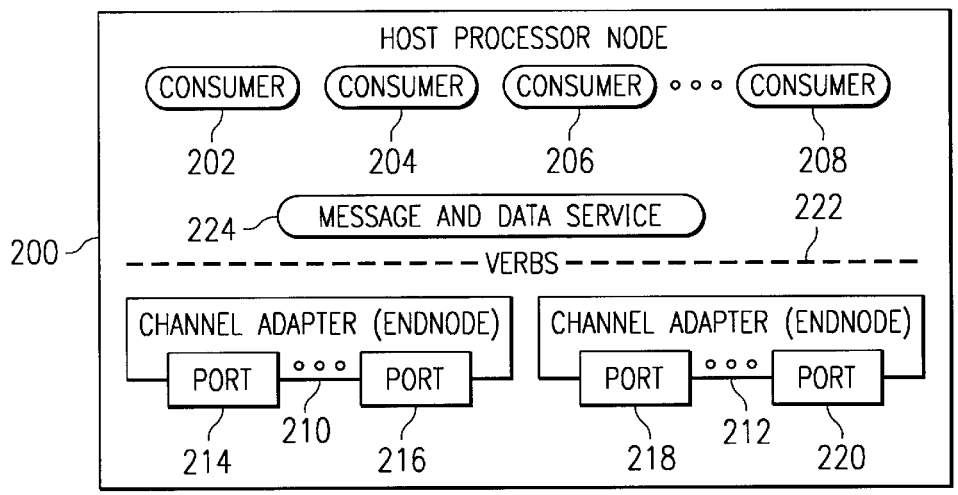
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host.

Additionally, host processor node 200 includes a message and data service 224, which is used to process messages and data received through channel adapter 210 and channel adapter 212. Message and data service 224 provides an interface to consumers 202–208 to process messages and other data.

Figure 3:
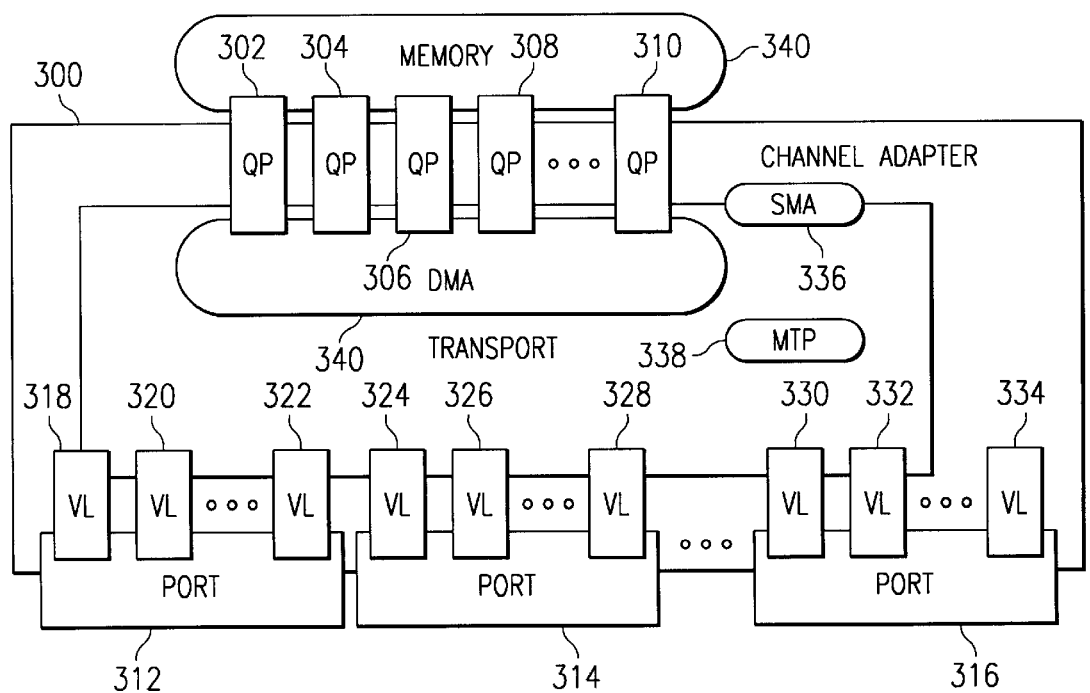
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages across the host channel adapter ports 312–316 and across the subnet. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue (RWQ). The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
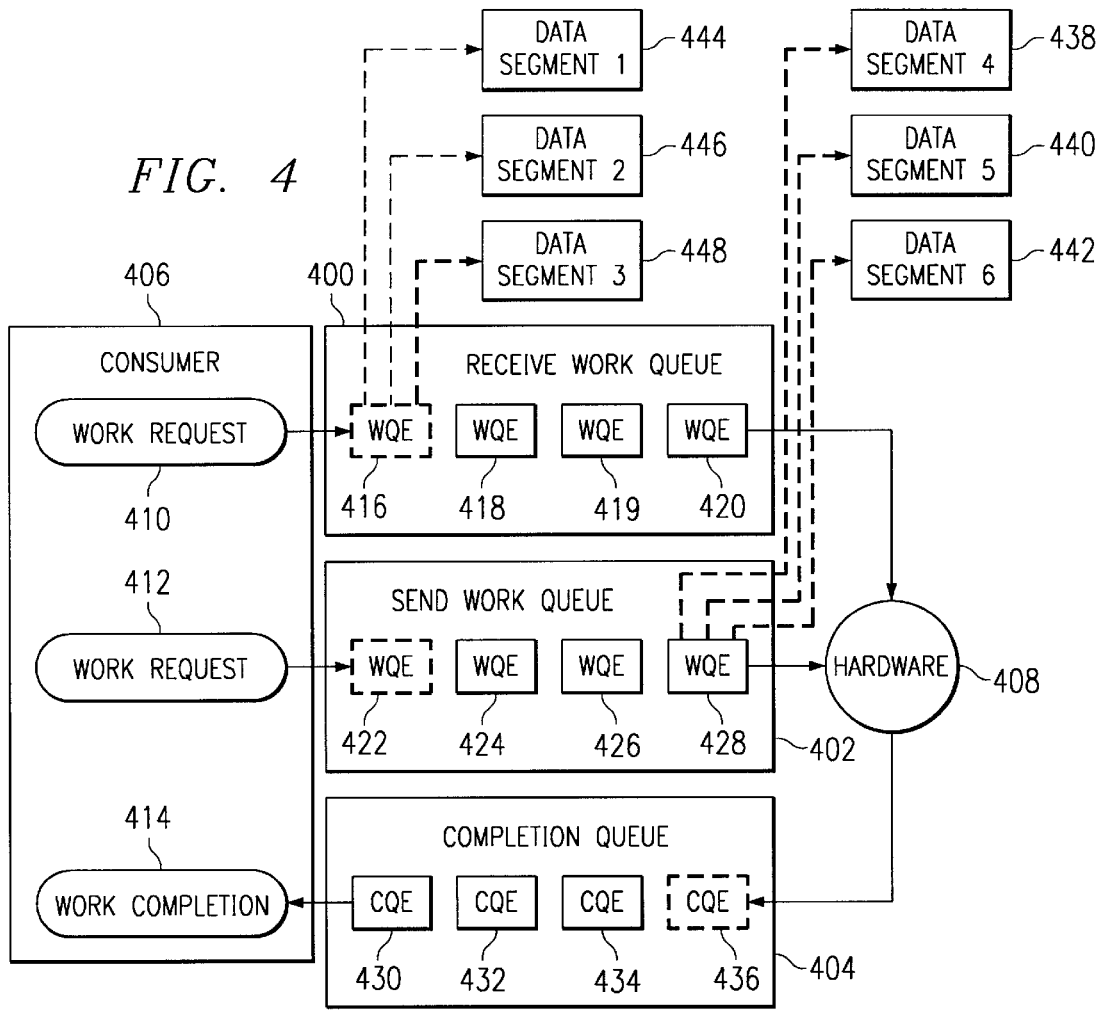
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is executed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444 and data segment 2 446. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services.

Reliable and unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $p^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $p^2 \times (N-1)$ queue pairs on each node. By comparison, the connectionless reliable datagram service only requires P queue pairs+(N−1) EE contexts on each node for exactly the same communications.

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 5:
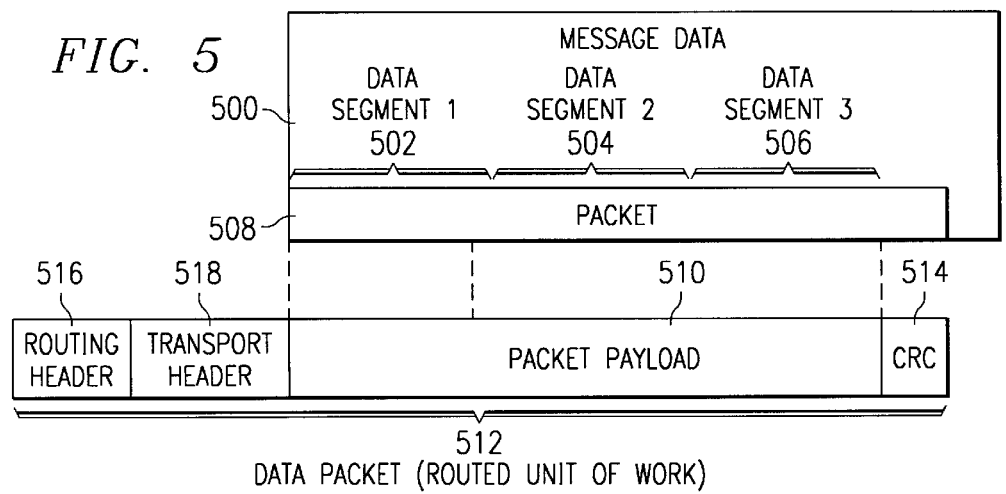
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figures 6, 7:
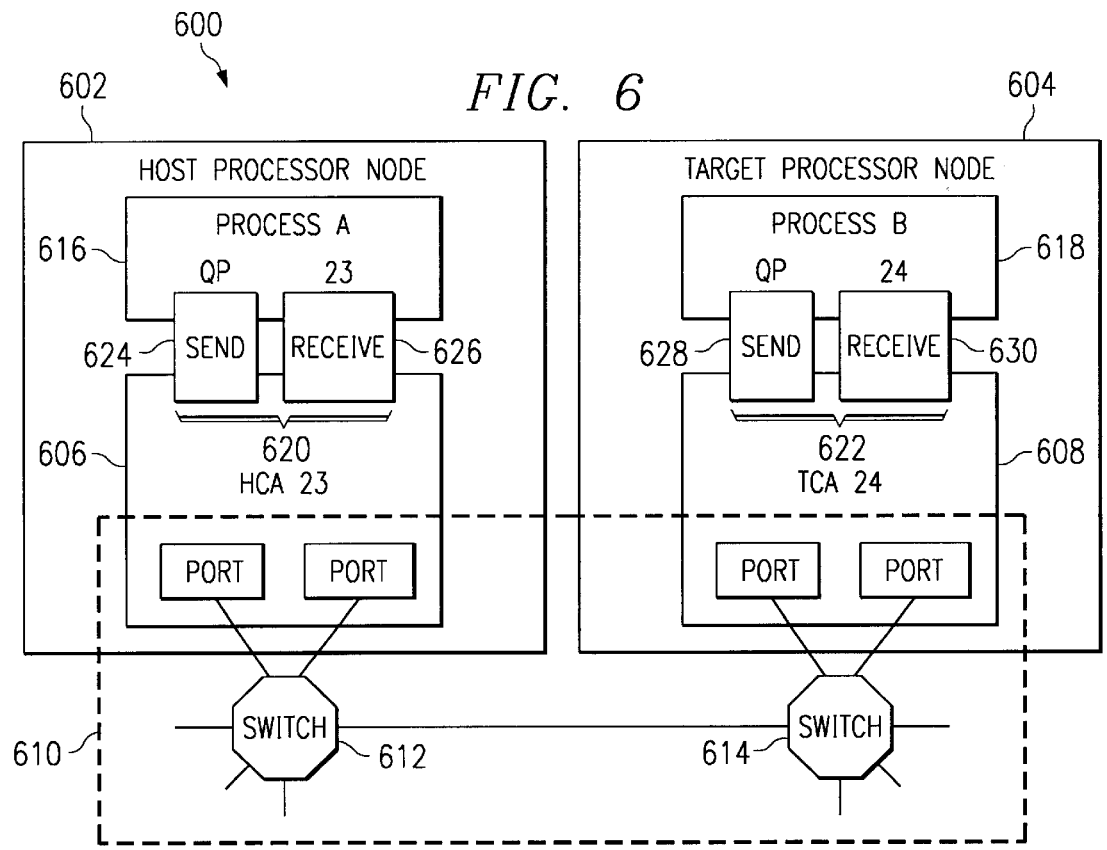
FIG. 6 is a diagram illustrating a portion of a distributed computer system in accordance with a preferred embodiment of the present invention.
FIG. 7 illustrates an example queue pair table data structure in accordance with a preferred embodiment of the present invention.

In FIG. 6, a diagram illustrating a portion of a distributed computer system is depicted in accordance with a preferred embodiment of the present invention. The distributed computer system 600 in FIG. 6 includes a host processor node 602 and a target processor node 604. Host processor node 602 includes a host channel adapter (HCA) 606. Target processor node 604 includes a target channel adapter (TCA) 608. The distributed computer system in FIG. 6 includes a SAN fabric 610 which includes a switch 612 and a switch 614. SAN fabric 612 in FIG. 6 includes a link coupling host channel adapter 606 to switch 612; a link coupling switch 612 to switch 614; and a link coupling target channel adapter 608 to switch 614.

In the example transactions, host processor node 602 includes a client process A 616. Target processor node 604 includes a client process B 618. Client process A 616 interacts with host channel adapter hardware 606 through queue pair 620. Client process B 618 interacts with target channel adapter 608 through queue pair 622. Queue pair 620 and queue pair 622 are data structures. Queue pairs 620 and 622 include send work queues 624 and 628, and receive work queues 626 and 630, respectively.

When a reliable datagram message is sent from the host channel adapter hardware 606 to the target channel adapter hardware 608, the send work queue 624 of host channel adapter 606 receives the message and transmits it to the receive work queue 630 of the target channel adapter 608. Each of the nodes 602 and 604 maintain a queue pair table for identifying queue pairs currently being utilized as well as various information relating to the status of these queue pairs. Thus, for example, the queue pair table for both the host node 602 and the target node 604 will include entries identifying their local queue pairs and the queue pair of the other node with which they are communicating.

FIG. 7 illustrates an example queue pair table data structure in accordance with the present invention. The queue pair table shown in FIG. 7 is for illustration purposes only. The queue pair table may include other fields in addition to, or in replacement of, the fields shown in FIG. 7 without departing from the spirit and scope of the present invention.

As shown in FIG. 7, the queue pair table includes a field 710 for identifying the requester queue pair, a field 720 for identifying the associated responder queue pair, a field 730 for identifying a status of a send work queue of the requester queue pair, a field 731 for identifying the status of a receive work queue of the requester queue pair, a field 740 for identifying a status of a send work queue of the responder queue pair, a field 741 for identifying the status of a receive work queue of the responder queue pair, and a field 750 for identifying a request packet error type when an error condition occurred. It should be noted that the queue pair table data structure provided in FIG. 7 is for illustrative purposes only. The actual queue pair table data structure used may contain other fields in addition to, or in replacement of, the fields shown in FIG. 7 without departing from the spirit and scope of the present invention.

As shown in FIG. 7, the queue pair table includes indicators of whether or not a send/receive work queue in the queue pair is currently in an error state or a working state. This indicator may be, for example, a bit for each queue in each queue pair in the queue pair table data structure. The bit may be set when an error condition occurs, for example.

When an error condition occurs in the host node 602 or in the host channel adapter 606, for example, the error may cause errors in the sending of messages from send work queue 624 to receive work queue 630. In prior architectures, such errors would cause both the send work queue 624 and the receive work queue 630, as well as the receive work queue 626, to be placed in an error state thereby precluding any further communication with or by those work queues.

With the present invention, when a reliable datagram error condition occurs, only the work queue associated with the error condition is placed in an error state. Thus, if an error occurs in the send work queue 624, for example, only send work queue 624 is placed in an error state. The other work queues 626 and 630 are not placed in the error state. This allows work queues 626 and 630 to continue to receive messages from other work queues and perform useful work while the error that occurred with the send work queue 624 is handled. In this way, send work queue 624 is paused and sympathy error is prevented from propagating through a network of nodes and queue pairs. Thus, the error is contained to only the work queue with which it occurred and is not spread to other work queues in the network.

The setting of the work queue to an error state may be performed by setting a bit associated with the queue, such as a bit in field 730 in the queue pair table, so as to indicate the presence of an error condition. An error recovery device may periodically scan the queue pair table to determine those work queues that have an error state and perform error recovery on those work queues. Alternatively, when a work queue is placed in an error state, an error recovery device may be notified of the error condition and error recovery may then be performed. Once error recovery is successfully completed, the bit associated with the work queue may then be reset so that proper functioning of the work queue may resume.

Error recovery is generally known in the art and thus, a detailed description of error recovery is not included in this description. It should be noted, however, that this invention is not limited to any one type of error recovery and any error recovery apparatus or method may be used without departing from the spirit and scope of the present invention.

In a further embodiment of the present invention, the queue pair table may contain one or more fields, such as field 750, for identifying a request packet that was currently being sent (or received) when the error condition occurred. When error recovery is successfully completed, the message may then be resent to thereby resume the operation of the work queues from the last known point of proper functioning.

If an error condition occurs when a send work queue is sending a message to a receive work queue of another node, the message may include an indicator that an error occurred during the transmission of the message. When the receive work queue receives the message along with the error indicator, the receive work queue discards the message as being corrupted. The receive work queue may then set a bit in its queue pair table to indicate that the send work queue of the other node is currently in an error condition. In this way, the target node is made aware that it should not expect to receive further messages from that send work queue until the error condition is resolved.

Should the error condition be resolved and the send work queue placed back into a working state, upon receipt of a message from the send work queue, the bit in the queue pair table associated with the send work queue will be reset to indicate that it is now in working condition.

Figure 8:
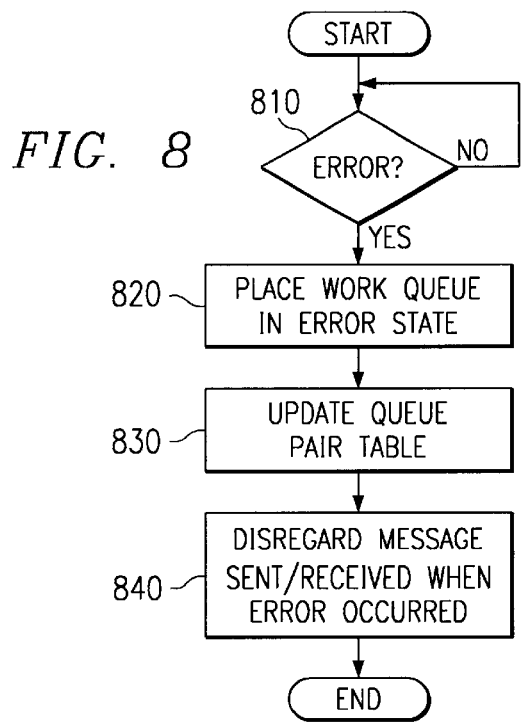
FIG. 8 is a flowchart outlining an exemplary operation of the present invention for detecting and handling reliable datagram error conditions.

FIG. 8 is a flowchart outlining an exemplary operation of the present invention for detecting and handling reliable datagram error conditions. As shown in FIG. 8, the operation starts with a determination as to whether or not an error occurred during the sending/receiving of a message (step 810). If an error did not occur, the operation returns to step 810 and continues to determine if an error occurred.

If an error did occur, the send work queue associated with the error is placed in an error state (step 820). The status of the work queue is then updated in the queue pair table for the node to identify the occurrence of the error and the message that was being sent/received when the error occurred (step 830). If the work queue was a receive work queue, the message received may be discarded in addition to updating the queue pair table (step 840). The operation then ends.

Figure 9:
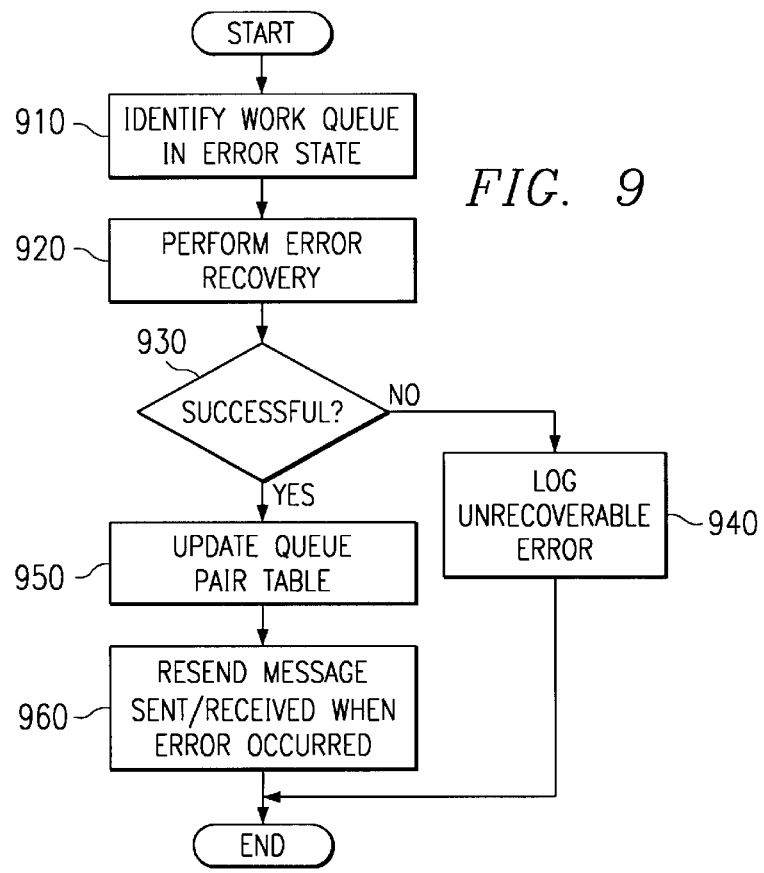
FIG. 9 is a flowchart outlining an exemplary operation of the present invention when recovering from an error condition.

FIG. 9 is a flowchart outlining an exemplary operation of the present invention when recovering from an error condition. As shown in FIG. 9, the operation starts with identifying a work queue in an error state (step 910). Error recovery is then performed on the work queue (step 920). A determination is then made as to whether or not the error recovery was successfully completed (step 930). If not, an unrecoverable error is logged and the work queue remains in an error state (step 940). Error recovery may be attempted again or the work queue may be taken off line.

If error recovery was successful, the queue pair table is updated to place the work queue into a working state (step 950). The message being sent/received at the time the error condition occurred may then be resent in order to continue operation at the last point of proper functioning of the work queue (step 960). The operation then ends.

Thus, the present invention provides an apparatus and method for pausing an work queue when an error condition occurs. The apparatus and method of the present invention place only the work queue associated with the error into an error state, rather than all work queues linked to the work queue in which the error occurred. This prevents sympathy error from propagating throughout a network of work queues and allows work queues to continue to perform useful work even in the presence of an error with one of the work queues.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of pausing a work queue in a network having a plurality of work queues, comprising:

detecting an error condition; and placing only a work queue associated with the error condition into an error state to thereby pause the world queue while allowing other work queues in the plurality of work queues to continue functioning, wherein the work queue is part of a work queue pair associated with a node in the network.

2. The method of claim 1, wherein the network is a system area network.

3. The method of claim 1, further comprising updating a status of the work queue in a queue pair table of the node to identify the work queue as being in an error state.

4. The method of claim 1, further comprising updating a status of the work queue in a queue pair table of the node to identify a message being communicated when the error condition occurred.

5. The method of claim 3, further comprising:

performing error recovery on the work queue; and updating a status of the work queue in the queue pair table to place the work queue in a working state.

6. The method of claim 4, further comprising:

performing error recovery on the work queue; and recommunicating the message identified in the queue pair table when error recovery is performed successfully.

7. The method of claim 1, wherein placing only a work queue associated with the error condition into an error state includes setting a bit associated with the work queue.

8. The method of claim 1, wherein the plurality of work queues comprise one or more work queue pairs associated with one or more network nodes, each of the one or more work queue pairs including a send queue and a receive queue, and wherein placing only a work queue associated with the error condition into an error state includes placing a send queue of a work queue pair into the error state while maintaining a receive queue of the work queue pair in an operational state.

9. An apparatus for pausing a work queue in a network having a plurality of work queues, comprising:

means for detecting an error condition; and means for placing only a work queue associated with the error condition into an error state to thereby pause the work queue while allowing other work queues in the plurality of work queues to continue functioning, wherein the work queue is part of a work queue pair associated with a node in the network.

10. The apparatus of claim 9, wherein the network is a system area network.

11. The apparatus of claim 9, further comprising means for updating a status of the work queue in a queue pair table of the node to identify the work queue as being in an error state.

12. The apparatus of claim 9, further comprising means for updating a status of the work queue in a queue pair table of the node to identify a message being communicated when the error condition occurred.

13. The apparatus of claim 11, further comprising:

means for performing error recovery on the work queue; and means for updating a status of the work queue in the queue pair table to place the work queue in a working state.

14. The apparatus of claim 12, further comprising:
means for performing error recovery on the work queue; and
means for recommunicating the message identified in the queue pair table when error recovery is performed successfully.

15. The apparatus of claim 9, wherein the means for placing only a work queue associated with the error condition into an error state includes means for setting a bit associated with the work queue.

16. The apparatus of claim 9, wherein the plurality of work queues comprise one or more work queue pairs associated with one or more network nodes, each of the one or more work queue pairs including as end queue and a receive queue, and wherein the means for placing only a world queue associated with the error condition into an error state includes means for placing a send queue of a work queue pair into the error state while maintaining a receive queue of the work queue pair in an operational state.

17. A computer program product in a computer readable medium for pausing a work queue in a network having a plurality of work queues, comprising:
first instructions for detecting an error condition; and
second instructions for placing only a work queue associated with the error condition into an error state to thereby pause the work queue while allowing other work queues in the plurality of work queues to continue functioning, wherein the work queue is part of a work queue pair associated with a node in the network.

18. The computer program product of claim 17, wherein the network is a system area network.

19. The computer program product of claim 17, further comprising third instructions for updating a status of the work queue in a queue pair table of the node to identify the work queue as being in an error state.

20. The computer program product of claim 17, further comprising third instructions for updating a status of the work queue in a queue pair table of the node to identify a message being communicated when the error condition occurred.

21. The computer program product of claim 19, further comprising:
fourth instructions for performing error recovery on the work queue; and
fifth instructions for updating a status of the work queue in the queue pair table to place the work queue in a working state.

22. The computer program product of claim 20, further comprising:
fourth instructions for performing error recovery on the work queue; and
fifth instructions for recommunicating the message identified in the queue pair table when error recovery is performed successfully.

23. The computer program product of claim 17, wherein the second instructions for placing only a work queue associated with the error condition into an error state includes instructions for setting a bit associated with the work queue.

24. The computer program product claim 17, wherein the plurality of work queues comprise one or more work queue pairs associated with one or more network nodes, each of the one or more work queue pairs including a send queue and a receive queue, and wherein the second instructions for placing only a work queue associated with the error condition into an error state includes instructions for placing a send queue of a work queue pair into the error state while maintaining a receive queue of the work queue pair in an operational state.

25. A method of pausing a work queue in a network node having a work queue pair including a send work queue and a receive work queue, comprising:
detecting an error condition; and
placing only the send work queue into an error state to thereby pause the send work queue while allowing the receive work queue to continue functioning.

26. The method of claim 25, further comprising updating a status of the send work queue in a queue pair table of the network node to identify the send work queue as being in an error state.

27. The method of claim 26, further comprising:
performing error recovery on the send wok queue; and
updating the status of the send work queue in the queue pair table to place the send work queue in a working state.

28. The method of claim 25, wherein placing the send work queue into an error state includes setting a bit associated with the send work queue.

* * * * *

UNITED STATES PATENT AND TRADEMARK OFFICE
CERTIFICATE OF CORRECTION

PATENT NO. : 6,766,467 B1
DATED : July 20, 2004
INVENTOR(S) : Neal et al.

It is certified that error appears in the above-identified patent and that said Letters Patent is hereby corrected as shown below:

Column 13,
Line 14, after "including" delete "as end" and insert -- a send --.
Line 16, before "queue" delete "world" and insert -- work --.

Column 14,
Line 38, after "send" delete "wok" and insert -- work --.

Signed and Sealed this

Twenty-fifth Day of October, 2005

JON W. DUDAS
*Director of the United States Patent and Trademark Office*